United States Patent [19]
Vogel

[11] 3,721,873
[45] March 20, 1973

[54] RECIPROCATING MOTOR

[76] Inventor: George R. Vogel, 221-22 Hempstead Avenue, Queens Village, N.Y. 11429

[22] Filed: March 14, 1972

[21] Appl. No.: 234,493

[52] U.S. Cl. .....................318/128, 310/20, 310/33, 318/134
[51] Int. Cl. .............................................H02k 33/18
[58] Field of Search..............318/119, 127, 128, 134; 310/15, 20, 23, 24, 27, 31, 33, 34, 35

[56] References Cited

UNITED STATES PATENTS

| 920,222 | 5/1909 | Tremain | 310/35 |
| 1,891,568 | 12/1932 | Morris et al. | 310/34 |

Primary Examiner—J. D. Miller
Assistant Examiner—H. Huberfeld
Attorney—Lowe & King

[57] ABSTRACT

An electric motive device includes two pairs of magnets, movable in pairs relative to each other. The magnets of each pair have pole faces positioned normally to cause the magnets of the respective pair to repel each other. The pole faces of each magnet are spaced to form an air gap through which magnetic flux flows between the pole faces of each magnet. A shuttle moves relative to the pairs of magnets into and out of the air gaps. The shuttle includes a magnetic core and a coil which is driven by a current source to enable the core to be saturated. The shuttle and magnets are interconnected with each other and a commutator by a lever arm system and a snap action device so that current is supplied only intermittently to the coil. When no current is supplied to the coil, the core provides a low reluctance path for fluxes of the magnets to enable the magnets to be drawn towards the shuttle. In response to movement of the magnets into close proximity with the shuttle, current is supplied to the coil, causing the core to become saturated and increase the reluctance thereof. Thereby, the adjacent pole faces of the magnets repel each other. The coil, when energized, functions as an electromagnet that is repelled from the air gap of one pair of magnets to the other pair of magnets.

11 Claims, 6 Drawing Figures

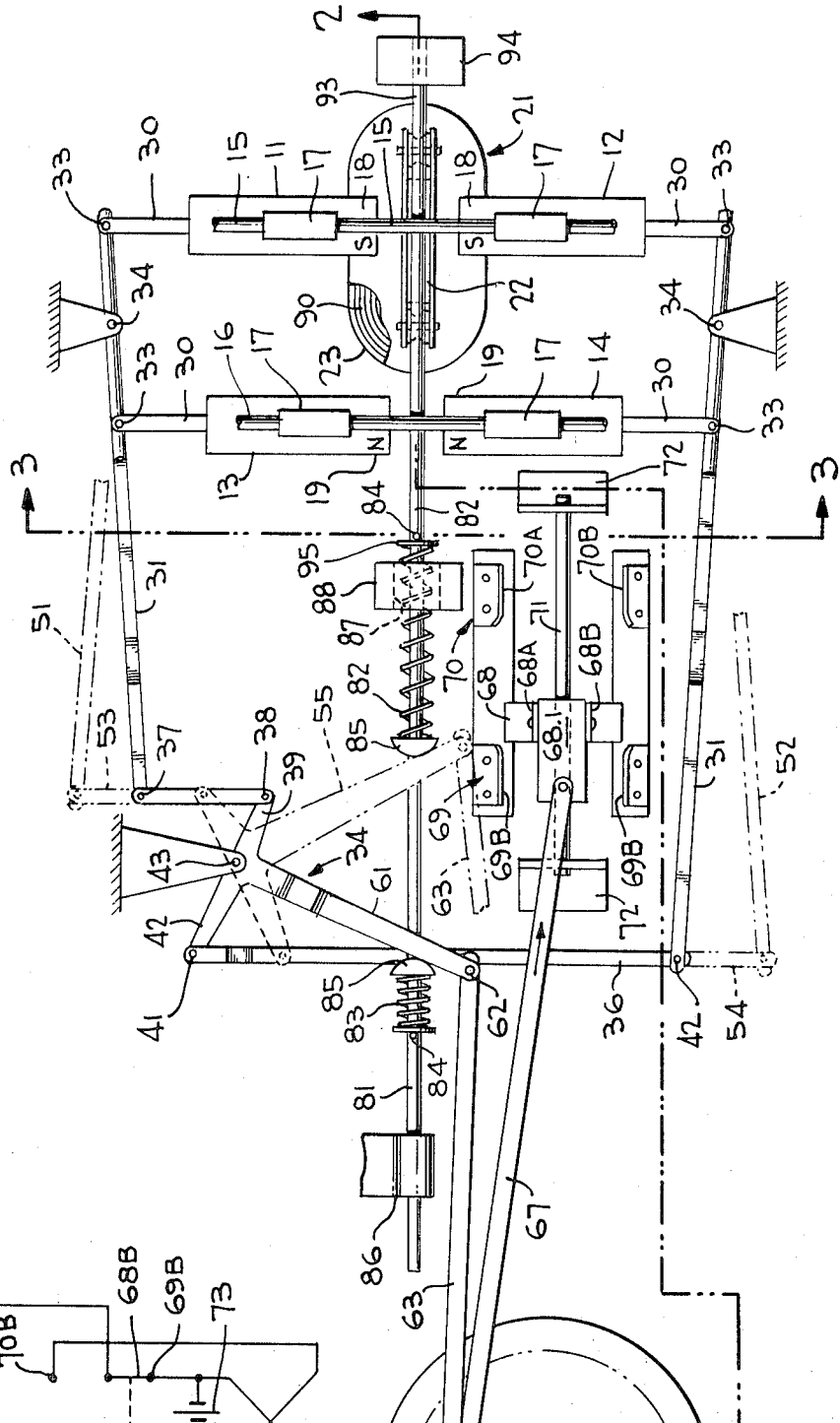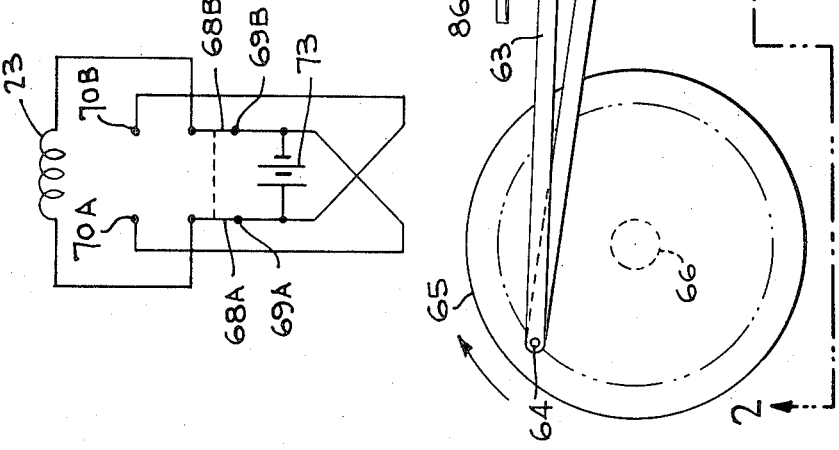

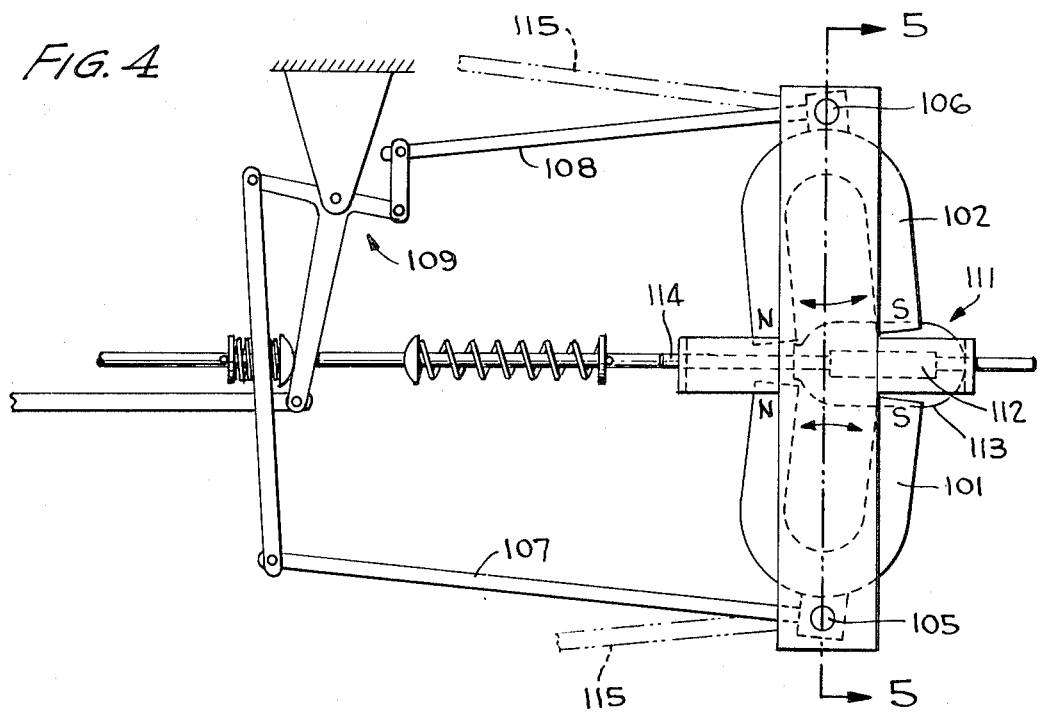
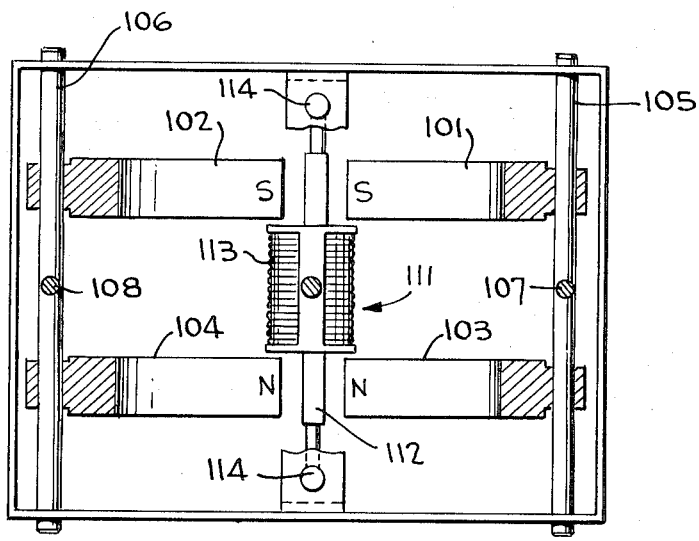

RECIPROCATING MOTOR

FIELD OF INVENTION

The present invention relates generally to electric motive devices and more particularly to an electric motive device wherein pairs of moving magnets and an electromagnet containing saturable magnetic core interact with each other.

BACKGROUND OF THE INVENTION

Most continuously operating electric motors function in response to a magnetic field being substantially at right angles to magnetic flux derived from an electric coil. Most motors of this type require the application of continuous or high duty cycle currents, requirements that in certain instances are undesirable.

BRIEF DESCRIPTION OF THE INVENTION

The present invention is a departure from the generally employed electric motive principle of the prior art. In motors of the present invention, there is provided a pair of magnets having pole faces positioned to be normally repelling. In an air gap between the normally repelling magnetic pole faces there is located a saturable magnetic core. When the core is not saturated, it presents a low reluctance to magnetic fluxes derived from the magnets, whereby the magnets are attracted toward the core. In response to the magnets coming into proximity with the core, the magnetic permeability of the core is reduced by supplying sufficient current to a coil mounted on the core to cause the core to become saturated. When the core is saturated, the magnetic permeability thereof drops and the core no longer functions as a low reluctance magnetic shield to the pole faces of the magnets. Thereby, the magnets are repelled from the core to provide motor action.

Motor action is augmented by providing two pairs of magnets between which the core and coil move on a shuttle. The magnets of the two pairs and the shuttle are interconnected with each other and a commutator by a lever system and a snap action mechanism, whereby current is synchronously supplied to the coil to provide continuous motor action between the shuttle and magnets. Further motor action is provided by repelling forces established between the pairs of magnets and an electromagnet formed by the coil and core. The polarity of the electromagnet is reversed by a commutator reversing the direction of current flow through the coil each time the shuttle comes into proximity with each pair of magnets. Current is supplied to the coil with an extremely low duty cycle, only great enough to enable the core to be driven into saturation and initiate motion of the magnets and shuttle. Principles of the invention are also applicable to generators.

It is, accordingly, an object of the present invention to provide a new and improved electric motive machine.

Another object of the invention is to provide a new and improved electric motor that is continuously operated with extremely low duty cycle currents.

Another object of the invention is to provide an electric motive machine utilizing magnetic attractive and repulsion forces.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIG. 1 is a top view of one embodiment of the invention;

FIG. 4 is a top view of a second embodiment of the invention;

FIG. 5 is a view taken through the line 5—5, FIG. 4; and

FIG. 6 is a circuit diagram of a commutator and coil of the embodiment illustrated in FIGS. 1-3.

DETAILED DESCRIPTION OF THE DRAWING

Figure 2:
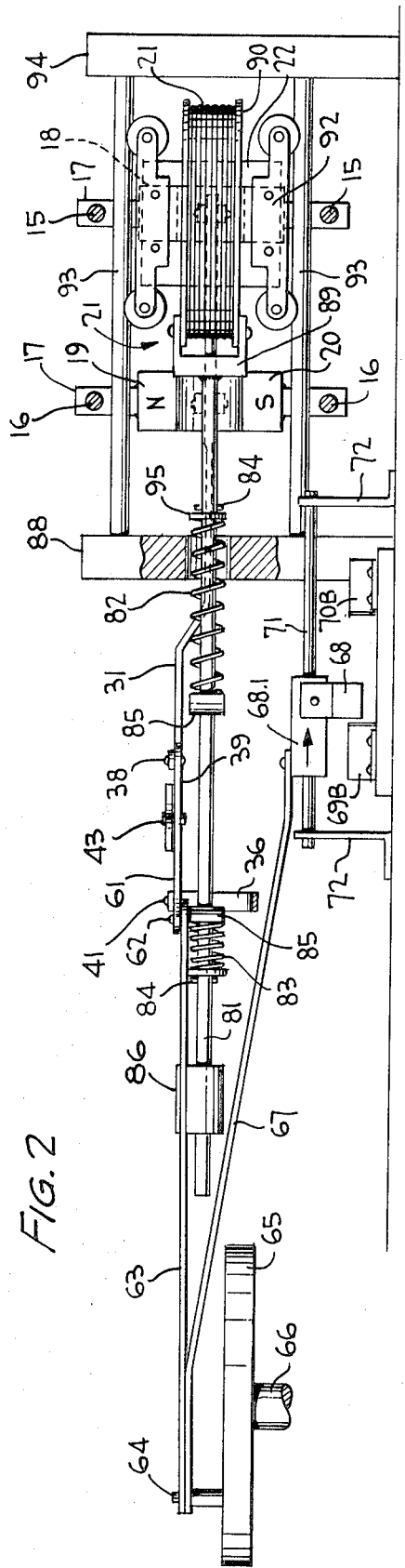
FIG. 2 is a side view of the embodiment illustrated in FIG. 1.
Figure 3:
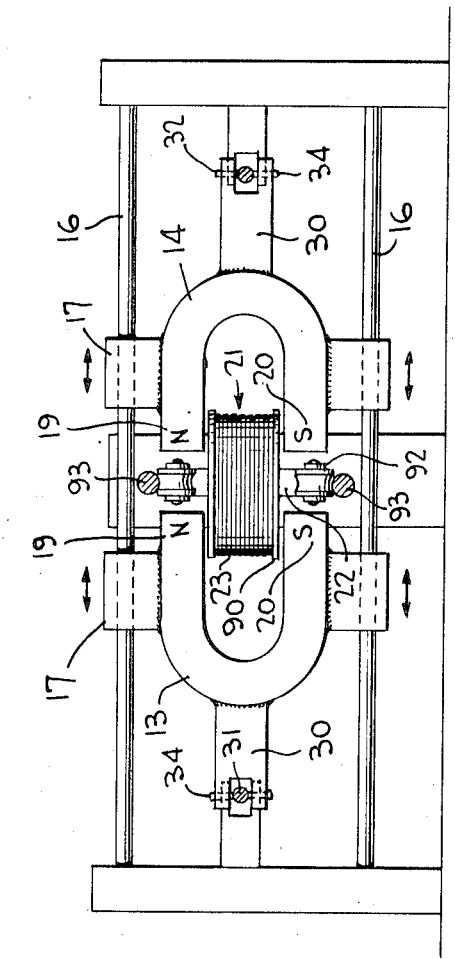
FIG. 3 is a view taken through the line 3—3, FIG. 1.

Reference is now made to FIGS. 1-3 of the drawing wherein there are illustrated horseshoe magnets 11-14 which are movable on parallel rails 15 and 16 by virtue of a fixed connection between the magnets and slidable trolleys 17, that ride on rails 15 and 16. Magnets 11-14 are arranged in pairs, so that magnets 11 and 12 are positioned to move on rails 15, while magnets 13 and 14 are positioned to move on rails 16. The first pair of magnets 11 and 12 is arranged so that south pole faces 18 thereof are aligned with each other, and north pole faces (not illustrated) thereof are aligned with each other. Similarly, north pole faces 19 of magnets 13 and 14 are aligned with each other, as are the south pole faces 20 of these magnets. Magnetic flux flows upwardly, as viewed in FIG. 1, in air gaps between magnets 11 and 12, while flux flows downwardly, as viewed in FIG. 1 in air gaps of magnets 13 and 14.

A shuttle 21 is positioned and mounted to be translated between the first pair of magnets 11 and 12 and the second pair of magnets 13 and 14. Shuttle 21 comprises a centrally located high magnetic permeability saturable, iron core 22 about which winding 23 is wound. Winding 23 is wound so that the turns thereof are generally horizontally disposed so that a magnetic field derived from winding 23 in response to current being supplied to the winding is generally aligned with the direction of magnetic flux flowing in the air gap between each of magnets 11-14. Current is supplied to coil 23 by a d.c. source via commutator 25. The current supplied to coil 23 is of sufficient amplitude to drive core 22 into magnetic saturation. With core 22 in a saturated condition, its magnetic permeability is reduced to a relatively low value and the magnetic reluctance of shuttle 21 is accordingly reduced. Thereby core 22 is, to a certain extent, transformed from a low reluctance to a high reluctance element, i.e., the core of coil 23 becomes essentially an air core in response to current being supplied to the coil. By virtue of mechanical interconnections between magnets 11-14, shuttle 21 and commutator 25 (as discussed infra) current is intermittently supplied to coil 23 at a relatively low duty cycle, only while magnets 11-14 are in relatively close proximity to core 22.

With core 21 positioned between magnets 11 and 12, as illustrated in FIG. 1, so that no current is supplied to winding 23 by commutator 25, the normally repelling forces between the aligned, like polarity pole faces of magnets 11 and 12 are not effective because of the low reluctance path established by core 22. Core 22 effectively shields the like polarity pole faces of magnets 11 and 12 so that the magnetic fluxes from these pole faces are short circuited through core 22 and flow directly from the north pole faces of magnets 11 and 12 to the south pole faces thereof. Thereby, magnets 11 and 14 are attracted toward core 22. Magnets 11 and 12 are drawn into close proximity with core 22, being prevented from contacting the core only by stops (not shown) in close proximity to the core.

In response to magnets 11 and 12 coming into closest proximity with core 22, commutator 25 is activated to supply current to winding 23, whereby the shuttle becomes an electromagnet with north and south poles adjacent the north and south poles of magnets 11 and 12. The shuttle is thereby repelled from between the pole faces of magnets 11 and 12 in the only direction it can go, toward the left as illustrated in FIG. 1. The repelling force between permanent magnets 11 and 12 and the electromagnet of the shuttle, in combination with the snap action of a mechanical interconnecting device, is such that shuttle 21 moves at a relatively high speed toward the region between magnets 13 and 14. While shuttle 21 is between magnets 11 and 12, and before it has begun to move significantly to the left, sufficient current is supplied to coil 23 to drive core 22 into saturation and its magnetic permeability decreased to a relatively low level. In response to the decreased magnetic permeability of core 22, the core no longer functions effectively as a magnetic shield for a significant portion of the magnetic flux derived from the pole faces of magnets 13 and 14 whereby magnetic fluxes of the adjacent, like polarity pole faces can interact with each other. In response to the like polarity pole faces of magnets 13 and 14 being adjacent and coupled with each other, the magnets are repelled and start to move away from each other and core 22.

In response to the repelling forces between the electromagnet of shuttle 21 and through a connection mechanism (described infra) between magnets 11-14, shuttle 21 and commutator 25, as magnets 11 and 12 begin to move away from shuttle 21, the shuttle is translated to the left, as viewed in FIG. 1, so that it is located between the pole faces of magnets 13 and 14. When shuttle 21 comes between the pole faces of magnets 13 and 14, current is no longer being supplied to coil 23, whereby core 22 is no longer saturated and has a substantial permeability and thereby low reluctance. When shuttle 21 initially comes between magnets 13 and 14, the magnets are spaced from each other by a substantial amount. The magnets are thereafter attracted to core 22 by virtue of the low reluctance path of the core. In response to magnets 13 and 14 coming into closest proximity with core 22, current is supplied to coil 23 in a direction opposite to that while shuttle 21 was between magnets 11 and 12. Thereby, there is established in shuttle 21 an electromagnet having north and south pole faces adjacent the north and south pole faces of magnets 13 and 14. The adjacent, like polarity pole faces of the electromagnet and of magnets 13 and 14 cause a mutual repulsion thereof, with movement of the shuttle to the right and a separation of magnets 13 and 14. Prior to significant movement of shuttle 21, core 22 again becomes saturated, whereby the adjacent like polarity pole faces of magnets 13 and 14 interact and the magnets are further repelled from each other. As magnets 13 and 14 initially move away from each other on rod 16, shuttle 21 is driven back into the gap between spaced magnets 11 and 12. Thereafter, magnets 11 and 12 move towards core 22 and the cycle is thereby repeated.

The mechanism interconnecting magnets 11–14, shuttle 21 and commutator 25 basically comprises a system of lever arms and a snap action mechanism.

The lever arm system includes push rods 31 and 32, pivotally connected by pins 33 to bars 30 which in turn are fixedly connected to the arcuate end portions of magnets 11–14. The ends of push rods 31 and 32 remote from the ends connected to pins 33 are connected to T-shaped member 34 by pinned connections through push rods 35 and 36, respectively. Push rod 35 is pivotably connected by pin 37 to one end of push rod 31 and is pivotably connected by pin 38 to arm 39 of T-shaped element 34. Push rod 36 is pivotally connected by pin 41 to the other arm 42 of T-shaped element 34. Element 34 is pivotally connected to a fixed point by pin 43 that bisects arms 39 and 42.

From the foregoing, it is believed apparent as to the manner in which magnets 11–14 are moved in synchronism. When magnets 13 and 14 are attracted to the fullest extent toward core 22, rods 31 and 32 pivot about pins 34 so that magnets 11 and 12 have maximum spacing from each other. When magnets 11 and 12 move through their fullest extent towards core 22, magnets 13 and 14 are mutually repelled from each other and are separated by the greatest possible amount. In response to movement of rods 31 and 32 to the positions illustrated in FIG. 1 by reference numerals 51 and 52 (which indicates a slight movement of magnets 13 and 14 from their positions of greatest separation), push rods 35 and 36 are drawn upwardly and downwardly, respectively, to the dotted line positions indicated by reference numerals 53 and 54. In response to the upward and downward movement of push rods 53 and 54, T-shaped element 34 is pivoted about pin 43 so that element 34 assumes the dotted line position indicated by reference numeral 55.

To synchronize the movement of magnets 11–14 and commutator 25, the commutator is driven via a connection from T-shaped element 34. To this end, an end of leg 61 of T-shaped element 34 remote from arms 39 and 42 is pivotally connected by pin 62 to one end of push rod 63. The other end of push rod 63 is pivotally connected by pin 64 to an eccentric proximate the periphery of fly wheel 65 that is mounted to rotate about shaft 66. Shaft 66 can be utilized as a rotary power take-off as drive for a generator. Pin 64 is also connected to push rod 67 that drives armature contacts 68 of commutator 25.

Commutator 25, in addition to including slidable, armature contacts 68 which are connected via leads (not shown) to coil 23, includes stationary contacts 69 and 70 which are connected to a d.c. source so as to supply opposite polarity currents to contacts 68. Contacts 69 and 70 are spaced from each other longitudinally by a distance equal to a movement of push rod 67 and contacts 68 during each half cycle of shuttle 21 traverse, whereby contacts 68 engage contacts 69 and 70 for only a relatively short duty cycle. To prevent lateral motion of contacts 68, the contacts are mounted on housing 68.1, which in turn is slidably mounted on stationary rod 71 that is fixedly mounted on plates 72. Contacts 68 are mechanically connected to magnets 11–14 through the various rods, pins, levers and flywheel 65 such that contacts 68 and 69 engage each other only while magnets 13 and 14 are in closest proximity to each other and contacts 68 and 70 engage each other only while magnets 11 and 12 are in closest proximity to each other.

The electric circuit for connecting the d.c. source to coil 23 via commutator 25 is illustrated in FIG. 6. The positive and negative terminals of d.c. source 73 are connected to separate ones of contacts 69, whereby the positive terminal is connected to contact 69A, and the negative terminal is connected to contact 69B. The negative and positive terminals of d.c. source 73 are respectively connected to contacts 70A and 70B which are respectively aligned with contacts 69A and 69B. Contacts 68A and 68B are connected to coil 23 so that current flows in a first direction through the coil in response to contacts 68 engaging contacts 69 and current flows in a second direction through the coil while contacts 68 engage contacts 70. Reversing the current in coil 23 provides the opposite polarity electromagnets for shuttle 21 and prevents build-up of any permanent residual flux in core 22.

The snap action motion mechanism coupling shuttle 21 with the movement of magnets 11-14 comprises a spring-biased push rod 81 which extends through a bushing of leg 61 of T-shaped element 34. To provide the spring bias, push rod 81 has mounted thereon a pair of shock absorbing compression springs 82 and 83, positioned on opposite edges of leg 61. One end of each spring bears against stop 84 and a second is connected to pad 85 that selectively engages an edge of leg 61. Lateral motion of push rod 81 is prevented by journalling it in fixedly mounted bearing 86.

Push rod 81 is mounted to be fixedly connected to shuttle 21. To this end, the right end of push rod 81 extends through bushing 87 in standard 88 so that it is bonded to non-magnetic clamp 89. Upper and lower, facing horizontal surfaces of clamp 89 are fixedly secured to non-magnetic cover plates 90 between which coil 23 is positioned. From FIGS. 2 and 3, it is noted that plates 90 fit in the air gap between the north and south poles of permanent magnets 11 and 12 and that core 22 extends upwardly and downwardly between the normally repelling like polarity pole faces of the permanent magnets. To stabilize movement of shuttle 21 between the two pairs of permanent magnets, the shuttle includes a pair of non-magnetic wheel assemblies 92 which ride on rails 93 that extend horizontally between standards 88 and 94.

To consider the operation of the entire device, assume that shuttle 21 has just moved to the position illustrated in FIG. 1 whereby magnets 11 and 12 have just become separated from each other by the farthest extent and leg 61 is rotated fully in the clockwise direction. At such time, rod 81 is shifted to the farthest extent in the right direction, whereby compression spring 83 is compressed to its maximum extent against the left edge of leg 61 and compression spring 82 is removed from the right edge of leg 61 and is open as far as it can extend. When magnets 11 and 12 are separated from each other and core 22 by the greatest amount, they begin to move toward core 22, as described supra.

In response to magnets 11 and 12 moving toward core 22, T-shaped element 34 pivots about pin 43 in a counterclockwise direction, whereby spring 83 expands. Because of the stored energy in spring 83, T-shaped element 34 is rotated in the counterclockwise direction with an initial relatively high acceleration. Thereby, flywheel 65 and contacts 68 initially move at a relatively high acceleration, so that contacts 68 and 69 are positively disconnected from each other. There is no movement of shuttle 21 at this time since its magnetic core 22 is locked by magnets 11 and 12. As magnets 11 and 12 come closest to each other, magnets 13 and 14 move away from each other by the farthest extent and rods 31 and 32 are driven approximately to the dotted line positions indicated by reference numerals 51. Simultaneously, the right edge of leg 61 bears against pad 85 of spring 82 and spring 83 is greatly expanded so that it contacts the left edge of leg 61 with only a small force. At the same time, contacts 68 and 70 engage each other so that current is supplied to coil 23, whereby shuttle 21 translates at high speed to the region between magnets 13 and 14. When shuttle 21 reaches the region between magnets 13 and 14, spring 82 is compressed to its fullest extent against the right edge of leg 61 while spring 83 is open to its fullest extent and its pad 85 is out of contact with leg 61. Leg 61 has, at this time, rotated only slightly from its extreme counterclockwise position so that contacts 68 are only slightly shifted to the left off of contacts 70. Rotation of leg 61 is in response to movement of magnets 11–14 which are, at this time, positioned so that magnets 11 and 12 are slightly spaced and magnets 13 and 14 are separated almost by the farthest extent. As the cycle progresses, magnets 13 and 14 are drawn toward core 22 and each other and magnets 11 and 12 recede from each other. In response to such movement of magnets 11–14, leg 61 is rotated in the clockwise direction while rod 81 is maintained stationary by virtue of the magnetic locking forces between core 22 and magnets 13 and 14. When magnets 13 and 14 are drawn as close as possible to core 22, contacts 68 engage contacts 70 so that current is supplied to coil 23, causing shuttle 21 to be shifted to the region between magnets 11 and 12. When shuttle 21 comes between magnets 11 and 12, the magnets have moved slightly from their extreme positions so that magnets 11 and 12 have translated toward each other by a small amount and magnets 13 and 14 have moved away from each other through a short distance. This small movement of magnets 11-14 causes disengagement of contacts 68 and 70 so that the electromagnet is no longer effective. From the foregoing, it is believed apparent how shuttle 21 is continuously reciprocated between the two pairs of magnets.

The principles of the invention can be extended to other magnet configurations, as illustrated by the embodiment of FIGS. 4 and 5. In the embodiment of FIGS. 4 and 5, the first pair of magnets having aligned, normally repelling pole faces comprises horseshoe magnets 101 and 102 which are located in a common, horizontal plane above the second pair of magnets having normally repelling, aligned pole faces; the second pair of magnets comprises horseshoe magnets 103 and 104. Magnets 101 and 103 are fixedly mounted on pivotable rod 105, while magnets 102 and 104 are fixedly mounted on pivotable rod 106. Magnets 101-104 are mounted on rods 105 and 106 so that the air gaps of magnets 102 and 104 are aligned, while the air gaps of magnets 101 and 103 are aligned. The upper pair of magnets 101 and 102 is arranged relative to the lower pair of magnets 103 and 104 so that the south poles of the upper magnets are aligned in the same vertical plane as the north poles of the latter. By providing two pairs of symmetrically arranged magnets, twisting of the magnets and their associated carrying shafts 105 and 106 is prevented. It is to be understood, however, that certain principles of the invention are applicable with only one pair of magnets, whereby in certain circumstances only magnets 101 and 102 need be employed.

Horizontally extending rods 107 and 108 are fixedly mounted on shafts 105 and 106, respectively. Rods 107 and 108 are connected to a pivotable T-shaped element 109 in substantially the same manner as rods 31 and 32 are connected to T-shaped element 34, FIG. 1. From T-shaped element 109, connections are made to a fly wheel and commutator in the same manner as described with regard to FIGS. 1-3. Also, the T-shaped element 109 is connected to shuttle 111 in the same manner that shuttle 21 is connected to be driven by T-shaped element 34. Shuttle 111 includes a saturable magnetic core 112 about which is wound a coil 113 having a longitudinal axis extending in the vertical direction. Thereby, the magnetic flux derived from coil 113 is at right angles to the direction of flux flowing between the pole faces of each magnet 101-104. By virtue of the current supplied to coil 113, there is established in shuttle 111, an electromagnet having pole faces of the same polarity as the adjacent poles of magnets 101-104 when the permanent magnet poles come into closest proximity with core 112. Thereby, when the north poles of magnets 101 and 102 and the south poles of magnets 103 and 104 come into closest proximity with core 112 and shuttle 111 is between these poles, current is supplied to coil 112 so that there is a north magnetic pole at the top of core 112 and a south magnetic pole at the bottom of core 112 to cause mutual repulsion of the permanent magnets and shuttle. In an opposite manner, south and north poles are induced at the upper and lower ends of core 112 when shuttle 111 is between the south poles of magnets 101 and 102 and the north poles of magnets 103 and 104 when the magnets have rotated into closest proximity with core 112. Thereby, shuttle 111 is repelled from the region between the south poles of magnets 101 and 102. Motion also occurs in the embodiment of FIGS. 4 and 5 because of the variation in the magnetic reluctance path between the normally repelling pole faces of the magnets.

To enable translation of shuttle 111 back and forth between the normally repelling pole faces of magnets 101-104, the shuttle is mounted to ride on fixedly positioned, horizontally extending rails 114. Immediately after shuttle 111 has arrived between the south poles of magnets 101 and 102, as illustrated in FIG. 4, the north pole faces of magnets 101 and 102 are slightly removed from closest proximity with each other, while the south pole faces of these magnets are separated from each other almost by the farthest extent. Just prior to this time shuttle 111 was between the north poles of magnets 101 and 102, and the north poles of magnets 101 and 102 were closest to each other. In response to north poles of magnets 101 and 102 being closest to each other current is supplied to coil 113 to establish the repelling electromagnet and the magnetic reluctance of core 112 is substantially reduced, whereby there is coupling of the repelling forces between the north poles of magnets 101 and 102. Simultaneously, the south poles of magnets 103 and 104, which are in closest proximity to each other, are magnetically coupled to each other. Thereby, magnets 101-104 pivot on shafts 105 and 106, causing rods 107 and 108 to spread apart toward the dotted line positions indicated by reference numerals 115, FIG. 4.

In response to the electromagnet action, shuttle 111 is driven from left to right, to the position illustrated in FIG. 4, so that the shuttle comes into the region between the south poles of magnets 101 and 102 and the north poles of magnets 103 and 104. Simultaneously, magnets 101-104 are pivoting about shafts 105 and 106 so that the south poles of magnets 101 and 102 are approaching shuttle 111. By the time the south poles of magnets 101 and 102 begin to interact with each other, core 112 is interposed between them to function as a magnetic shield and prevent interaction between the similarly directed magnetic fluxes thereof. Thereby, magnets 101 and 102 rotate about shafts 105 and 106 until the south poles thereof come close proximity with core 112. Simultaneously, the north poles of magnets 103 and 104 are drawn toward core 112. Rotation of magnets 101-104 proceeds in the stated manner until the south poles of magnets 101 and 102 come into closest proximity with each other, at which time current is supplied to coil 113. A repelling electromagnet is then again established and immediately thereafter the magnetic fluxes derived from the south poles of magnets 101 and 102 and from the north poles of magnets 103 and 104 interact and repel. Thereby, shuttle shifts back between the north poles of magnets 101 and 102 and rods 107 and 108 move towards each other. This initiates a new half-cycle of operation which proceeds in a manner believed obvious from the preceding description.

While there has been described and illustrated one specific embodiment of the invention, it will be clear that variations in the details of the embodiment specifically illustrated and described may be made without departing from the true spirit and scope of the invention as defined in the appended claims. For example, a secondary coil can be mounted coaxially with coils 23 or 113 to enable the device to function as a motor-generator. Also, the shuttle can be translated between the magnets by a motor, whereby an a.c. voltage is generated across the coil mounted on the shuttle.

I claim:

1. An electric motive device comprising a pair of magnets movable relative to each other, said magnets having pole faces positioned to cause the magnets to repel each other when the pole faces are in proximity with each other, a magnetic core positioned in an air gap between the pole faces, the pole faces of said magnets being movable into and out of proximity with the core, said core being a magnetic shield to cause the magnets to be simultaneously attracted into proximity with it, and means for increasing the magnetic reluctance of the core in response to the magnets being attracted into proximity with the core whereby magnetic fluxes of the pole faces of the magnets interact and the magnets are simultaneously repelled from proximity with the core.

2. An electric motive device comprising a pair of magnets movable relative to each other, said magnets having pole faces positioned to cause the magnets to repel each other when the pole faces are in proximity with each other, a shuttle movable relative to said magnets in a direction generally at right angles to a direction of movement of the magnets, said shuttle moving into and out of air gap between the pole faces, said shuttle including a magnetic core, said magnets being simultaneously movable into and out of proximity with the core, said core being a magnetic shield to cause the magnets to be attracted to it while the shuttle is in the air gap, means for increasing the magnetic reluctance of the core in response to the magnets being attracted into proximity with the shuttle, whereby the magnetic fluxes of the pole faces of the magnets interact and the magnets are repelled from the shuttle, and means for coupling together the movements of the magnets and shuttle so that the shuttle is withdrawn from the air gap in response to the magnets being drawn adjacent the core.

3. An electric motive derive comprising magnet means having first, second, third and fourth pole faces, said first and second pole faces being of like polarity, said third and fourth pole faces being of like polarity, means for mounting the first and second pole faces to be movable relative to each other so that they come into proximity with each other and move away from each other, a first air gap being established by said first and second pole faces, means for mounting the third and fourth pole faces to be movable relative to each other so that they come into proximity with each other and move away from each other, a second air gap being established by said third and fourth pole faces, said first and second pole faces being arranged relative to the third and fourth pole faces so that forces from the first and second pole faces do not interact substantially with forces from the third and fourth pole faces, a shuttle movable between the first and second air gaps, said shuttle including a magnetic core, said pole faces being movable into and out of proximity with the core, said core being a magnetic shield to cause the pole faces to be attracted to it while the shuttle is in the respective air gaps, means for increasing the magnetic reluctance of the core in response to the pole faces associated with the respective air gaps being attracted into proximity with the shuttle, whereby magnetic fluxes of the pole faces of the associated air gap interact and the pole faces of the associated air gap are repelled from the shuttle, and means for synchronizing movement of the pole faces associated with the first air gap with the movement of the pole faces associated with the second air gap and the movement of the shuttle so that the pole faces associated with the first air gap are moving toward each other as the pole faces associated with the second air gap are moving away from each other and the shuttle is withdrawn from the air gaps in response to the pole faces associated with each air gap being drawn adjacent the core.

4. The device of claim 3 wherein the means for increasing the magnetic reluctance of the core includes a winding on the core, and means for supplying sufficient current to the winding to drive the core into saturation in response to the pole faces associated with the respective air gaps coming into proximity with the core.

5. The device of claim 4 wherein the means for supplying includes means for feeding current in a first direction to the coil while the shuttle is in the first air gap and means for feeding current in a second direction, opposite from the first direction, while the shuttle is in the second air gap.

6. The device of claim 3 wherein the means for synchronizing includes spring biased means for affecting movement of the shuttle away from said air gaps.

7. An electric motive device comprising a first pair of magnets movable relative to each other, a second pair of magnets movable relative to each other in a plane generally parallel to the movement of the first pair of magnets, said first and second pairs of magnets being arranged so that forces from the first pair of magnets do not interact substantially with forces from the second pair of magnets, the magnets of each pair having pole faces positioned to cause the magnets of the respective pair to repel each other when the pole faces of the magnets of the pair are adjacent each other, the pole faces of each magnet being spaced to form an air gap through which magnetic flux flows between the pole faces of each magnet, the magnetic fluxes of each magnet of the first pair flowing in the same direction through the air gaps thereof, the magnetic fluxes of each magnet of the second pair flowing in the same second direction through the air gaps thereof, said first and second directions being opposed to each other, a shuttle movable relative to said magnets in a direction generally at right angles to a direction of movement of the magnets, said shuttle moving into and out of the air gaps between the pole faces of each pair of magnets so that the shuttle is in both air gaps of the first pair of magnets at the same time and out of the air gaps of the second pair of magnets at the same time, said shuttle including a magnetic core and a coil wound on the core, said coil being wound so that a component of magnetic flux derived from it is aligned with a component of magnetic flux in each of the air gaps, said core being a magnetic shield to cause the magnets to be attracted to it while the shuttle is in the air gaps, means for reversing the direction of the magnetic flux derived from the coil in synchronism with movement of the shuttle between the air gaps of the first and second pairs of magnets, and means for coupling together the movements of the magnets and shuttle so that the shuttle is withdrawn from the air gaps as the magnets are being repelled from the core.

8. An electric motive device comprising a first pair of magnets movable relative to each other, a second pair of magnets movable relative to each other in a plane generally parallel to the movement of the first pair of magnets, said first and second pairs of magnets being arranged so that forces from the first pair of magnets do not interact substantially with forces from the second pair of magnets, the magnets of each pair having pole faces positioned to cause the magnets of the respective pair to repel each other when the pole faces of the magnets of the pair are adjacent each other, the pole faces of each magnet being spaced to form an air gap through which magnetic flux flows between the pole faces of each magnet, the magnetic fluxes of each magnet of the first pair flowing in the same direction through the air gaps thereof, the magnetic fluxes of each magnet of the second pair flowing in the same second direction through the air gaps thereof, said first and second directions being opposed to each other, a shuttle movable relative to said magnets in a direction generally at right angles to a direction of movement of the magnets, said shuttle moving in a direction generally parallel to the direction of flux flow between the pole faces of the magnets of the first and second pairs, said shuttle moving from a first position between first like polarity pole faces of magnets of the first pair to a second position between second like polarity pole faces of magnets of the first pair, said first and second polarities being different, said shuttle including a magnetic core and a coil wound on the core, said coil being wound so that a component of magnetic flux derived from it is at right angles to a component of magnetic flux in each of the air gaps, said core being a magnetic shield to cause the magnets to be attracted to it while the shuttle is in the first and second positions, means for reversing the direction of the magnetic flux derived from the coil in synchronism with movement of the shuttle between the first and second positions, and means for coupling together the movements of the magnets and shuttle so that the shuttle is withdrawn from the first and second positions as the magnets are being repelled from the core.

9. An electric motive device comprising a pair of magnets movable relative to each other, said magnets having pole faces positioned to cause the magnets to repel each other when the pole faces are in proximity with each other, a shuttle movable relative to said magnets in a direction generally at right angles to a direction of movement of the magnets, said shuttle moving into and out of air gap between the pole faces, said shuttle including a magnetic core, said magnets being simultaneously movable into and out of proximity with the core, said core being a magnetic shield to cause the magnets to be attracted to it while the shuttle is in the air gap, a coil on the core, means supplying current to the coil for forming an electromagnet having pole faces that cause repulsion of the shuttle from the magnets in response to movement of the magnets into proximity with the core.

10. An electric motive device comprising magnet means having first, second, third and fourth pole faces, said first and second pole faces being of like polarity, said third and fourth pole faces being of like polarity, means for mounting the first and second pole faces to be movable relative to each other so that they come into proximity with each other and move away from each other, a first air gap being established by said first and second pole faces, means for mounting the third and fourth pole faces to be movable relative to each other so that they come into proximity with each other and move away from each other, a second air gap being established by said third and fourth pole faces, said first and second pole faces being arranged relative to the third and fourth pole faces so that forces from the first and second pole faces do not interact substantially with forces from the third and fourth pole faces, a shuttle movable between the first and second air gaps, said shuttle including a magnetic core, said pole faces being movable into and out of proximity with the core, said core being a magnetic shield to cause the pole faces to be attracted to it while the shuttle is in the respective air gaps, a coil on the core, means supplying current to the coil forming opposite polarity electromagnets having pole faces that cause repulsion of the shuttle from the first air gap toward the second air gap in response to the first and second pole faces coming into proximity with the core and that cause repulsion of the shuttle from the second air gap toward the first air gap in response to the third and fourth pole faces coming into proximity with the core.

11. An electric motive device comprising a first pair of magnets movable relative to each other, a second pair of magnets movable relative to each other in a plane generally parallel to the movement of the first pair of magnets, said first and second pairs of magnets being arranged so that forces from the first pair of magnets do not interact substantially with forces from the second pair of magnets, the magnets of each pair having pole faces positioned to cause the magnets of the respective pair to repel each other when the pole faces of the magnets of the pair are adjacent each other, the pole faces of each magnet being spaced to form an air gap through which magnetic flux flows between the pole faces of each magnet, the magnetic fluxes of each magnet of the first pair flowing in the same first direction through the air gaps thereof, the magnetic fluxes of each magnet of the second pair flowing in the same second direction through the air gaps thereof, said first and second directions being opposed to each other, a shuttle movable relative to said magnets in a direction generally at right angles to a direction of movement of the magnets, said shuttle moving into and out of the air gaps between the pole faces of each pair of magnets so that the shuttle is in both air gaps of the first pair of magnets at the same time and out of the air gaps of the second pair of magnets at the same time, said shuttle including a magnetic core and a coil wound on the core, said coil being wound so that there can be established in the shuttle electromagnets having pole faces repelling the pole faces forming the air gaps, said core being a magnetic shield to cause the magnets to be attracted to it while the shuttle is in the air gaps, means for reversing the direction of the magnetic flux derived from the coil in synchronism with movement of the shuttle between the air gaps of the first and second pairs of magnets.

* * * * *